United States Patent [19]
Kelly et al.

[11] Patent Number: 5,479,159
[45] Date of Patent: Dec. 26, 1995

[54] APPARATUS AND SYSTEM FOR STREET LIGHT MONITORING

[75] Inventors: William Kelly, Albrighton; Leslie Kendall, Birmingham, both of England

[73] Assignee: Mutual Systems Ltd., Dudley, England

[21] Appl. No.: 843,501

[22] Filed: Feb. 28, 1992

[30] Foreign Application Priority Data

Mar. 8, 1991 [GB] United Kingdom ............... 9104881

[51] Int. Cl.[6] .................... H05B 37/02; H05B 37/03; H05B 39/06
[52] U.S. Cl. .................. 340/825.08; 315/119; 315/127; 315/292; 315/316
[58] Field of Search ................ 315/129, 312, 315/119, 127, 292, 316, 324; 340/310 A, 641, 642, 870.02, 825.08; 362/233; 307/38, 39, 40

[56] References Cited

U.S. PATENT DOCUMENTS

| | | | |
|---|---|---|---|
| 3,579,030 | 5/1971 | Ealing et al. | 315/292 |
| 4,124,839 | 11/1978 | Cohen | 340/870.02 |
| 4,396,844 | 8/1983 | Miller et al. | 307/40 |
| 4,520,274 | 5/1985 | Stants | 307/39 |
| 4,707,679 | 11/1987 | Kennon et al. | 307/39 |
| 4,808,982 | 2/1989 | Knapp | 340/641 |
| 4,810,936 | 3/1989 | Nuckolls et al. | 315/119 |
| 5,095,502 | 8/1992 | Finzel | 379/40 |
| 5,194,860 | 3/1993 | Jones et al. | 340/870.02 |

*Primary Examiner*—Thomas G. Black
*Assistant Examiner*—David Yiuk Jung
*Attorney, Agent, or Firm*—Dvorak and Traub

[57] ABSTRACT

A monitoring apparatus is included in each street light of a plurality of street lights. Each monitoring apparatus monitors the operation of the associated street lamp and stores data representing the operation thereof. Data is sent from each monitoring apparatus to a monitoring station, via the power supply cables connected to the street lamps, under control of the monitoring station. The monitoring station stores the data until it is requested to transfer the data to an interrogating station. The data is then analysed to identify faulty street lights.

21 Claims, 4 Drawing Sheets

EARTHING NOT SHOWN

EARTHING NOT SHOWN 5,479,159

APPARATUS AND SYSTEM FOR STREET LIGHT MONITORING

The present invention relates to an apparatus and system for monitoring street lighting.

Devices that are designed to perform a task dependent on the time or on environmental conditions are often cheaper to operate and more reliable than manually operated devices. An example of a device which benefits from automation is the street lamp. It would be expensive to employ a workforce so as to have each lamp turned on manually as daylight faded and turned off again at daybreak. There is, however, a disadvantage in having automatic street lamps responsive to time and/or to ambient lighting levels. The failure of an automatic street lamp may go undetected for a substantial time.

Strategies for preventing unknown failures from existing for a long time may include the manual inspection of street lights or maintenance being performed more frequently than the expected lifetime of the constituent parts of the street lamp would dictate. However, such strategies are inefficient and/or expensive.

According to a first aspect of the invention, there is provided an apparatus for monitoring operation of a street light, comprising providing means for providing data representing the operational state of the street light, storing means for storing the data, and access means for providing external access to the stored data.

The providing means may comprise a transducer for monitoring the supply of electrical power to a lamp of the street light.

The storing means may comprise means for storing the or each time at which the street light is turned on or off.

The access means may comprise means for sending signals via a power supply line to the street light.

According to a second aspect of the invention, there is provided a system for monitoring operation of a plurality of street lights, comprising an apparatus according to the first aspect of the invention for each street light, and a monitoring station comprising communication means for communicating with the access means of each of the apparatuses, storage means for storing data from the access means, and external communication means for providing external access to the data stored in the storage means.

Preferably the monitoring station is located at a junction of power supply lines to the street lights and the communication means is arranged to communicate with each of the access means via the power supply lines.

Preferably the communication means is arranged to interrogate and receive data from each of the apparatuses in turn.

Preferably the monitoring station includes processing means for producing diagnostic data representing the operative condition of each street light and for storing the diagnostic data in the storage means.

Preferably the external communication means includes data transmitting means responsive to an external enquiry for transmitting at least some of the data stored in the storage means. The data transmitting means may be arranged to respond to an enquiry and transmit data by means of a line such as a power supply or telephone line, radio communication, ultrasonic communication, or in any other suitable way.

The system may comprise a plurality of monitoring stations, each arranged to serve a respective group of street lights. The system may further comprise a mobile interrogating station arranged to interrogate each monitoring station when in the vicinity thereof.

It is thus possible to provide an apparatus and a system which permits the operation of a street lighting installation to be improved and/or the requirement for servicing personnel to be reduced.

The invention will be further described, by way of example, with reference to the accompanying drawings, in which.

Figure 1:
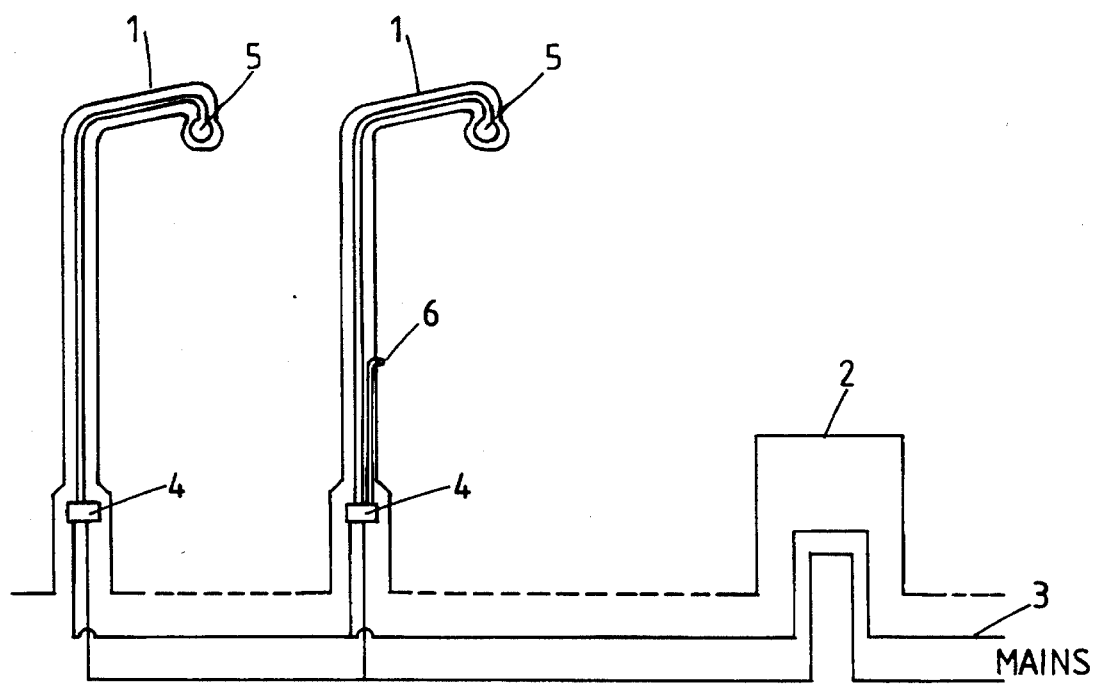
FIG. 1 is a schematic diagram of an arrangement of street lamps.

FIG. 1 shows a street lamp installation in which, for convenience, only two street lamps and only one supply box 2 are shown. However, any number of such lamps may be connected to in groups to any number of such supply boxes 2. The street lamps of the group shown have a single node of electrical connection with the mains power supply 3 at the supply box 2. Each street lamp 1 has a controller 4 that controls the power to a lamp 5 so as to switch it on and off at predetermined times, and/or in response to the ambient lighting condition as measured by a light sensor 6.

Figure 2:
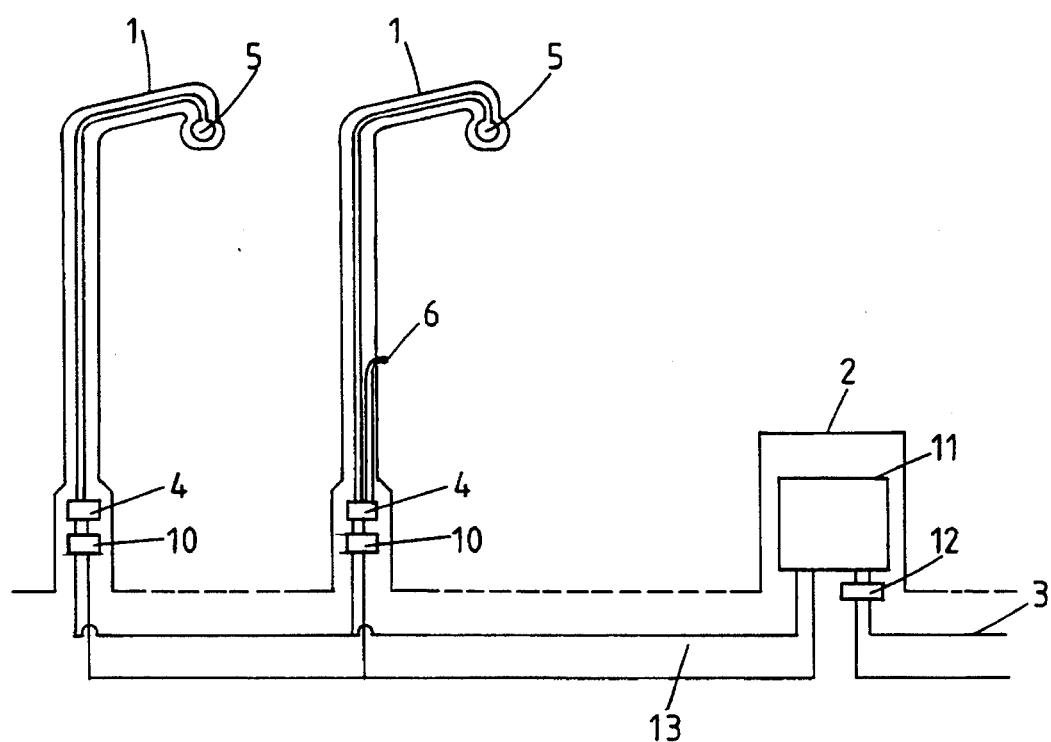
FIG. 2 is a schematic diagram of an arrangement of street lamps incorporating an embodiment of the present invention.

FIG. 2 shows an installation in which a basic signalling module (BSM) 10 is located in each street lamp 1. Each BSM 10 is arranged to monitor the current taken by the associated lamp 5 and to communicate with a logger 11 at the supply box 2 via power cables 13. A filter 12 is provided in the supply to the street lamp/BSM/logger combination so as to prevent mains borne communication signals from entering the mains supply and interfering with other equipment. Each BSM 10 continuously monitors the operation of its associated street lamp.

Each BSM 10 is microprocessor controlled, the microprocessor interpreting the data about the associated lamp 5 in order to determine if the associated lamp 5 is working correctly. The microprocessor also handles the communications between each BSM 10 and the logger 11. Each BSM 10 has a unique address and will not respond until it has been addressed by the logger 11 and invited to respond.

The logger 11, which is also microprocessor controlled, periodically addresses each BSM 10 and receives data from it. The data are stored in the logger along with the lamp address so that the performance of each individual street lamp 1 can be identified. The logger 11 contains a non-volatile memory so that stored data will not be affected by power loss.

The logger 11 stores the street lamp status in conjunction with the time so that the action of street lamps 1 controlled by timers or light sensitive elements may be monitored. If no current is sensed for a specific lamp 5 in a 24 hour period, the logger records that the specific lamp 5 has failed. If a group of electrically adjacent BSMs 10 fails to respond, a fault in the power cables 13 is the probable cause. The approximate position of such a fault may be found by examination of the data recorded by the logger 11. If a specific BSM 10 fails to respond, the logger 11 records that the specific BSM 10 has failed. The logger 11 can also maintain data such as the total hours each lamp 5 has been lit, the number of hours that have elapsed since a lamp 5 has failed, the number of hours that have elapsed since a lamp was tested, and the BSM number and lamp post serial number associated with each street lamp 1.

Periodically the logger is interrogated by a data collection unit so as to collect the data from a plurality of loggers 11 for analysis. The transfer of data from each logger 11 to the data collection unit could be done by electrical connection to a socket on the logger 11, or an ultrasonic or radio link, so that the data collection unit need only be in the proximity of a logger 11, or a supply box 2 housing a logger 11, to collect data. Alternatively the data could be collected via a telephone link. The telephone link could be either a land line or a radio telephone.

The data collection unit (not shown) processes data from the loggers and may include a display for providing an indication of faulty street lamps 1 or faulty BSMs 10. The data collection unit can also be used to program a logger 11 so that extra street lamps 1 can be added to an existing installation or the address of a BSM 10 can be updated if a faulty BSM 10 is replaced. Once the required data have been passed between the logger 11 and the data collection unit, the logger 11 is reinitialised.

Figure 3:
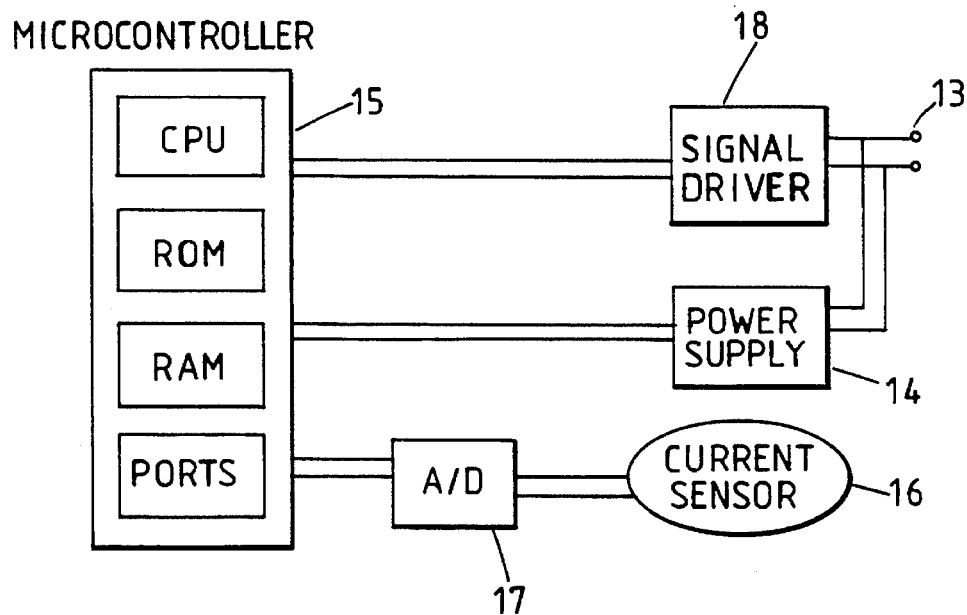
FIG. 3 is a block diagram of a basic signalling module of the embodiment of FIG. 2.

FIG. 3 shows a block diagram of a BSM 10. Each BSM 10 receives its power from, and communicates to the logger 11 by, the power cables 13. A power supply 14 provides power to a microcontroller 15. The current through the associated lamp 5 is measured by a current sensor 16. The measured value of the current is converted to digital data by an analogue to digital converter 17 and supplied to the microcontroller 15. The microcontroller 15 communicates with the logger 11 via a signal driver 18 that allows the communication signals to be passed along the power cables 13. The micro controller 15 contains, among other things, a random access memory (RAM). As is very well known, such as RAM is specifically intended to store data and, apart from storing data relevant to the internal working of the micro controller, also stores data relating to the operational state of the street light.

Figure 4:
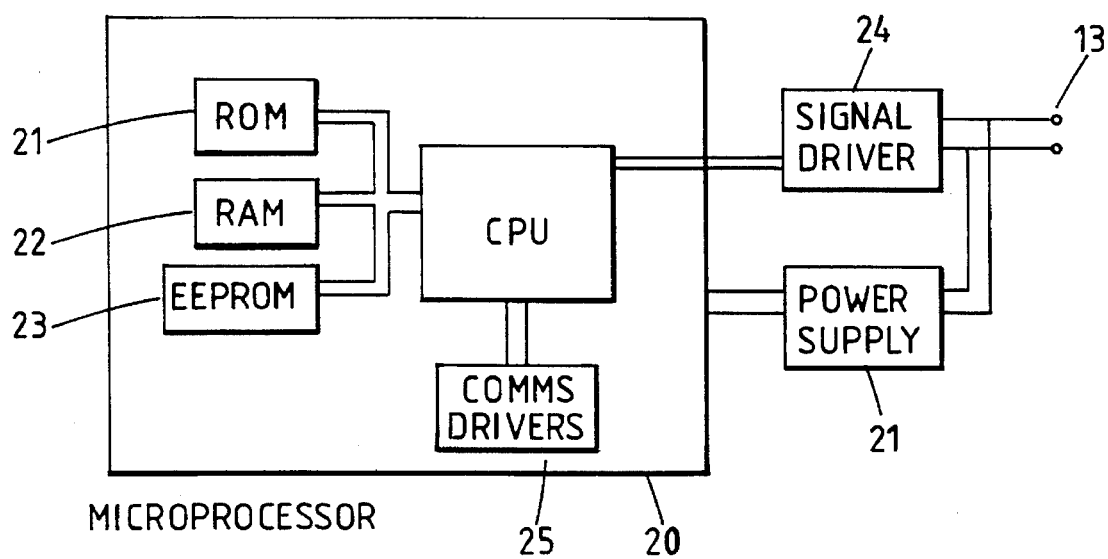
FIG. 4 is a block diagram of a logger unit of the embodiment of FIG. 2.

As shown in FIG. 4, the logger 11 includes a microprocessor 20. The microprocessor 20 receives power from a power supply 21 connected to the power cables 13. The microprocessor 20 has a program read only memory 21 and a random access memory 22. Processed data are stored in a non-volatile memory 23 provided by an electrically erasable read only memory. The microprocessor communicates with each BSM 11 via a signal driver 24 connected to the power cables 13.

The microprocessor has communications drivers 25 for communication with external devices. The drivers 25 may be linked to an external device such as a data collection unit by a direct electrical connection, or by telephone, radio or ultrasonic link.

Figure 5:
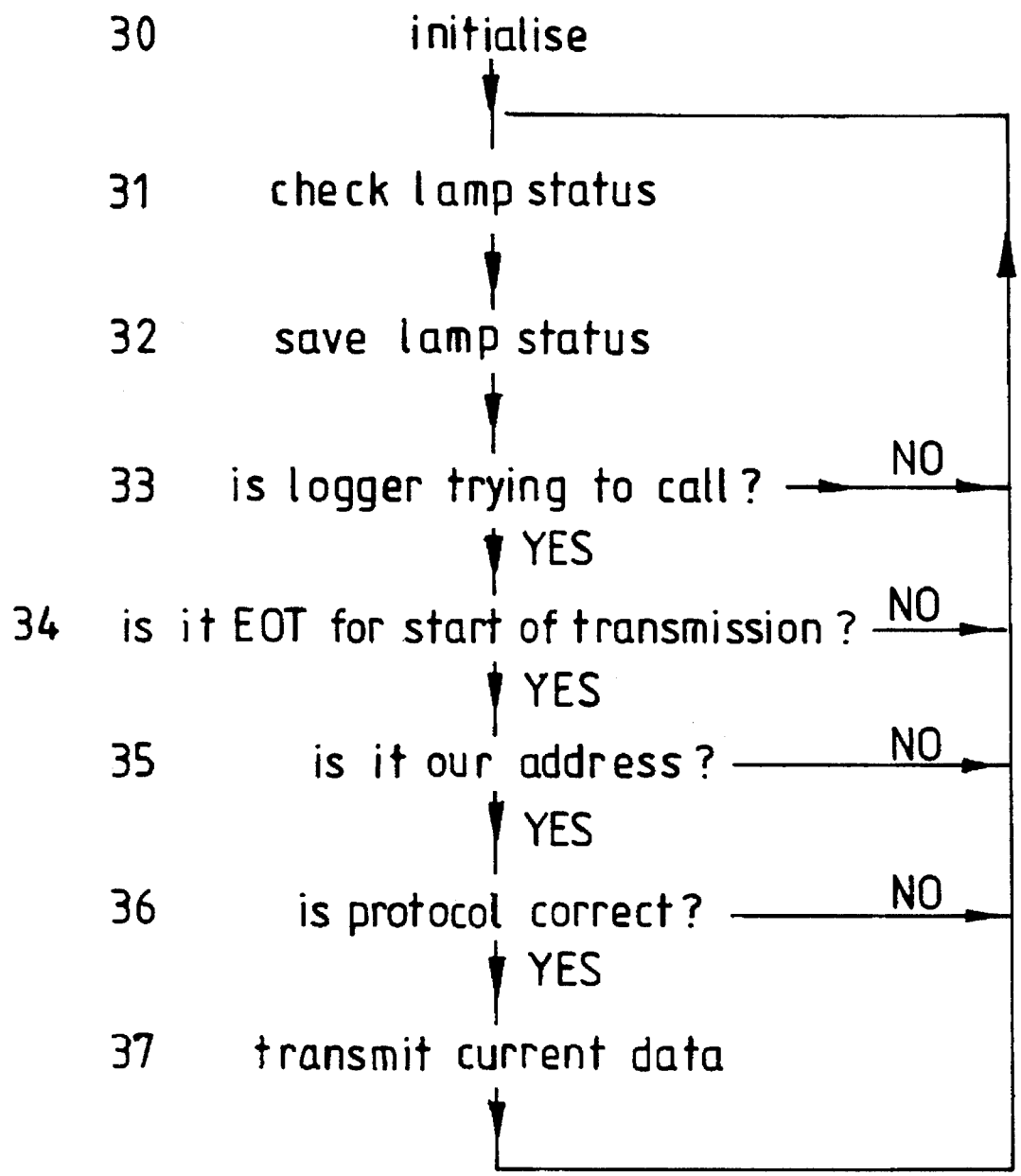
FIG. 5 is a flow diagram illustrating operation of the basic signalling module of FIG. 3.

FIG. 5 shows a flow chart for the operation of each BSM 10. After initialisation at step 30, each BSM 10 checks the status of its associated street lamp 1 at step 31 by measuring the associated lamp current and stores it at step 32. At step 33 the BSM 10 checks the power cables 13 to determine whether the logger 11 is calling. If the logger 11 is not calling, then control returns to the step 31. If the logger 11 has sent a call signal, the BSM performs steps 34 to 36 to check if it is being polled and, if the logger 11 is ready to receive data. If the BSM 10 is selected and the logger 11 is ready, then the BSM 10 transmits its data to the logger 11 at step 37. After transmission, if the BSM 10 is not being polled, or communication between the BSM 10 and the logger 11 has failed, control is returned to the step 31.

Figure 6:
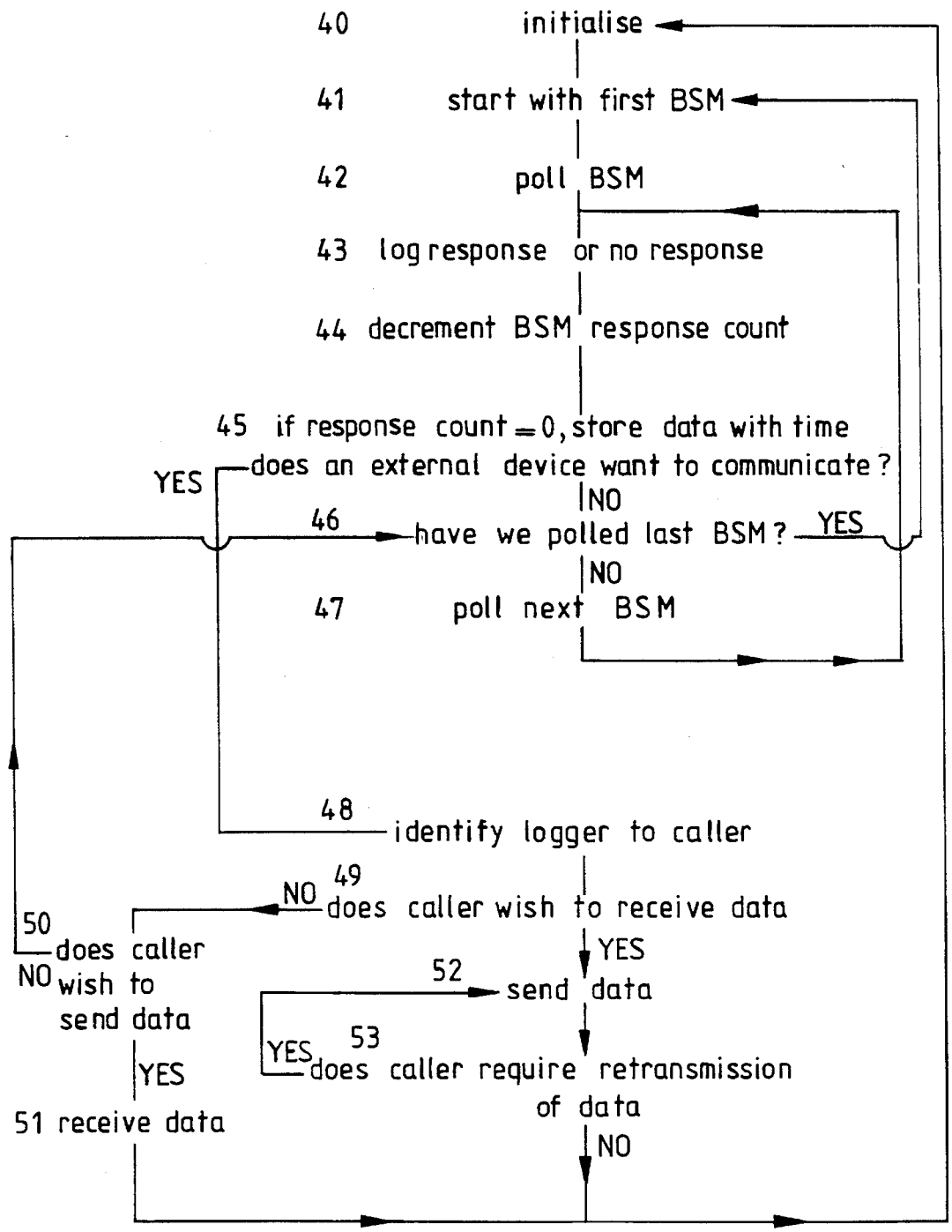
FIG. 6 is a flow diagram illustrating operation of the logger unit of FIG. 4.

FIG. 6 shows a flow chart for the logger 11. After initialisation at step 40, the logger 11 starts collecting data from each BSM 10 on its network. Step 41 selects the first BSM 10. At step 42 the addressing and data request signals are issued and at step 43 the response of the BSM 10 is stored. Step 45 checks to see if an external device, such as a data collection unit, wishes to communicate with the logger 11. If no external device wishes to communicate control is passed to step 46. Step 46 checks to see if all the BSMs on the network have been polled. If not, step 47 selects the next BSM and control is then passed to the step 43. Once all the BSMs 10 have been polled, control passes back to the step 41.

If an external device does wish to communicate, the logger 11 identifies itself at step 48. At step 49 the logger checks whether the caller wishes to receive data from the logger 11. If so, the logger 11 sends its data at step 52 and then checks, at step 53, if the caller requires the data to be resent. Once the data have been successfully passed, operation of the logger 11 returns to the step 40. If the caller does not wish to receive data, control passes to step 50. The logger 11 checks whether the caller wishes to transmit data. For instance, the number of street lamps 1 on the network may have been changed requiring the logger operation to be modified. If the caller wishes to transmit data, then the logger 11 receives the data at step 51 and then returns control to the step 40. If the caller fails to indicate that it wishes to transmit data, then the logger 11 returns to monitoring of the BSMs 10 at the step 46.

After data from one or more loggers 11 have been collected by one or more data collection units, the data may be loaded into a computer for analysis. The analysis may show when a street lamp 1 has not been on at all, when a street lamp 1 has failed to extinguish, when a street lamp 1 has illuminated outside a given time period or when a group of street lamps 1 has failed. Such analysis may indicate lamp failure, light sensor failure, timer failure and power cable faults respectively. The computer may produce a list of faulty street lamps 1 and suggest the most likely fault, the street lamp location, parts required, likely repair time and when the fault occurred. Statistical data about street lamp failure rates may also be produced.

It is thus possible to provide an automatic checking system which does not require manual checking of individual street lights for correct operation. Faults can be detected and diagnosed more quickly so as to permit more rapid repairs. The cost of manufacturing, installing, and operating such system can be rapidly recovered by the reduced personnel requirements which the system permits, and the efficiency of street lighting can be substantially improved.

Various modifications may be made within the scope of the invention. For instance the BSMs 10 may be arranged to participate in the control of the street lamps 1 such that, at certain times such as dusk, only a proportion of the street lamps are on. For this purpose, the BSMs 10 may be arranged to receive, as well as send, data. Thus, the street lamps may be arranged as two or more groups which are progressively illuminated as light levels fall. A substantial saving in electricity may be obtained by such a system.

We claim:

1. An apparatus for monitoring operation of a street light, comprising providing means for providing data representing an operational state of the street light, the operational state indicating whether the street light is operating correctly or incorrectly or whether it has failed, storing means for storing the data including each time at which the street light is turned between on and off, and access means for providing external access to the data from said storing means.

2. An apparatus as claimed in claim 1, in which said providing means comprises a transducer for monitoring a supply of electrical power to a lamp of the street light.

3. An apparatus as claimed in claim 1, in which said access means comprises sending means for sending signals via a power supply line connected to the street light.

4. A system for monitoring operation of a plurality of street lights, comprising a plurality of monitoring apparatuses and at least one monitoring station, each of said plurality of monitoring apparatuses being associated with a respective one of the plurality of street lamps and comprising providing means for providing data representing an operational state of the associated one of the street lights, the operational state indicating whether the street light is operating correctly or incorrectly or whether it has failed, storing means for storing the data including each time at which the associated one of the street lights is turned between on and off, and access means for providing external access to the data from said storing means, said at least one monitoring station comprising communication means for communicating with said access means of each of said monitoring apparatuses, storage means for storing data received from said access means via said communication means, and external communication means for providing access to the data stored in said storage means.

5. A system as claimed in claim 4, in which said at least one monitoring station is located at a junction of a mains supply and the power supply line to the street lights.

6. A system as claimed in claim 4, in which said communication means is arranged to communicate with each of said access means via a power supply line.

7. A system as claimed in claim 4, in which said communication means is arranged to interrogate and receive data from each of said monitoring apparatuses in turn.

8. A system as claimed in claim 4, in which said at least one monitoring station further comprises processing means for processing data representing an operative condition of each of the street lights and for storing the diagnostic data in said storage means.

9. A system as claimed claims 4, in which said external communication means includes data transmitting means, said data transmitting means being responsive to an external enquiry for transmitting at least some of the data stored in said storage means.

10. A system as claimed in claim 9, in which said transmitting means is arranged to transmit data by using at least one of a group comprising a telephone line, a radio link, an ultrasonic link, and a power line.

11. A system as claimed in claim 4, in which said at least one monitoring station comprises a plurality of monitoring stations, each of which is associated with a respective group of the plurality of street lights.

12. A system as claimed in claim 11, further comprising a mobile interrogating station for interrogating each of the plurality of monitoring station from a vicinity thereof.

13. A system for monitoring operation of a plurality of street lights, comprising a plurality of monitoring apparatuses and at least one monitoring station, each of said plurality of monitoring apparatuses being associated with a respective one of the plurality of street lamps and comprising providing means for providing data representing an operational state of the associated one of the street lights, the operational state indicating whether the street light is operating correctly or incorrectly or whether it has failed, storing means for storing the data, and access means for providing external access to the data from said storing means, said at least one monitoring station comprising communication means for communicating with said access means of each of said monitoring apparatuses, storage means for storing data received from said access means via said communication means, and external communication means for providing access to the data stored in said storage means, said communication means being arranged to interrogate and receive data from each of said monitoring apparatuses in turn.

14. A system as claimed in claim 13, in which said at least one monitoring station is located at a junction of a main supply and the power supply line to the street lights.

15. A system as claimed in claim 13, in which said communication means is arranged to communicate with each of said access means via a power supply line.

16. A system as claimed in claim 13, in which said storing means of each of said monitoring apparatuses is arranged to register into storage each time at which the associated one of the street lights is turned between on and off.

17. A system as claimed in claim 13, in which said at least one monitoring station further comprises processing means for processing data representing an operative condition of each of the street lights and for storing the diagnostic data in said storage means.

18. A system as claimed in claim 13, in which said external communication means includes data transmitting means which is responsive to an external inquiry for transmitting at least some of the data stored in said storage means.

19. A system as claimed in claim 18, in which said transmitting means is arranged to transmit data by using at least one of a group comprising a telephone line, a radio link, an ultrasonic link, and a power line.

20. A system as claimed in claim 13, in which said at least one monitoring station comprises a plurality of monitoring stations, each of which is associated with a respective group of the plurality of street lights.

21. A system as claimed in claim 20, further comprising a remote mobile interrogating station for interrogating each of the plurality of monitoring stations from the vicinity thereof.

\* \* \* \* \*